Aug. 29, 1944.    G. D. MAIGE    2,357,213
FLUSH VALVE ACTUATOR
Filed Aug. 17, 1943

George D. Maige   INVENTOR.

BY
Victor J. Evans & Co.
ATTORNEYS

Patented Aug. 29, 1944

2,357,213

UNITED STATES PATENT OFFICE 2,357,213

FLUSH VALVE ACTUATOR

George D. Maige, El Dorado, Ark.

Application August 17, 1943, Serial No. 499,004

5 Claims. (Cl. 4—67)

My invention relates to water closet flush valves, and includes among its objects and advantages the provision of an improved valve actuator so designed as to operate equally well by a push or pull movement, and in which the actuator is so devised as to be exceptionally sensitive to push or pull forces for the sake of easy operation.

Figure 1:
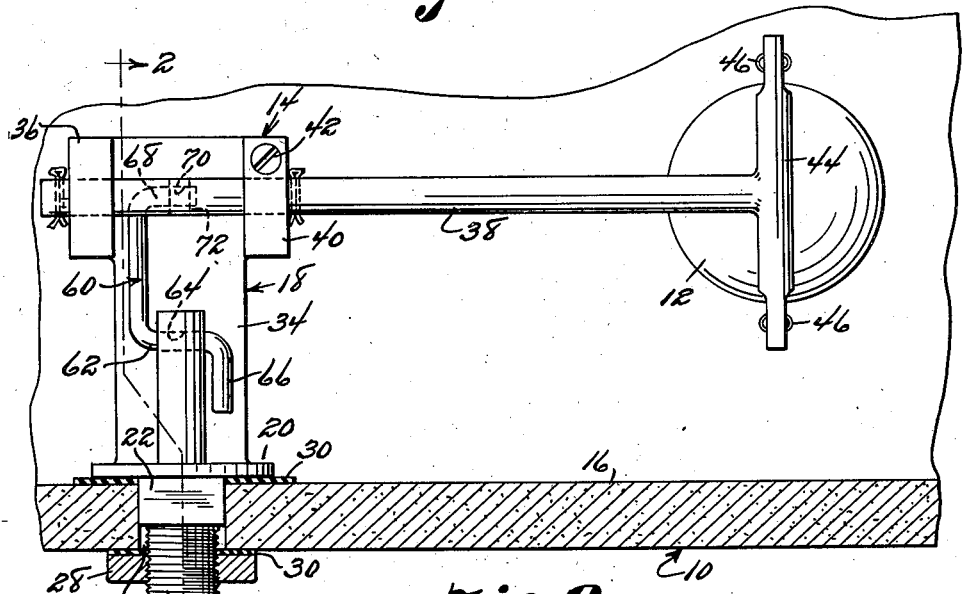
Figure 2:
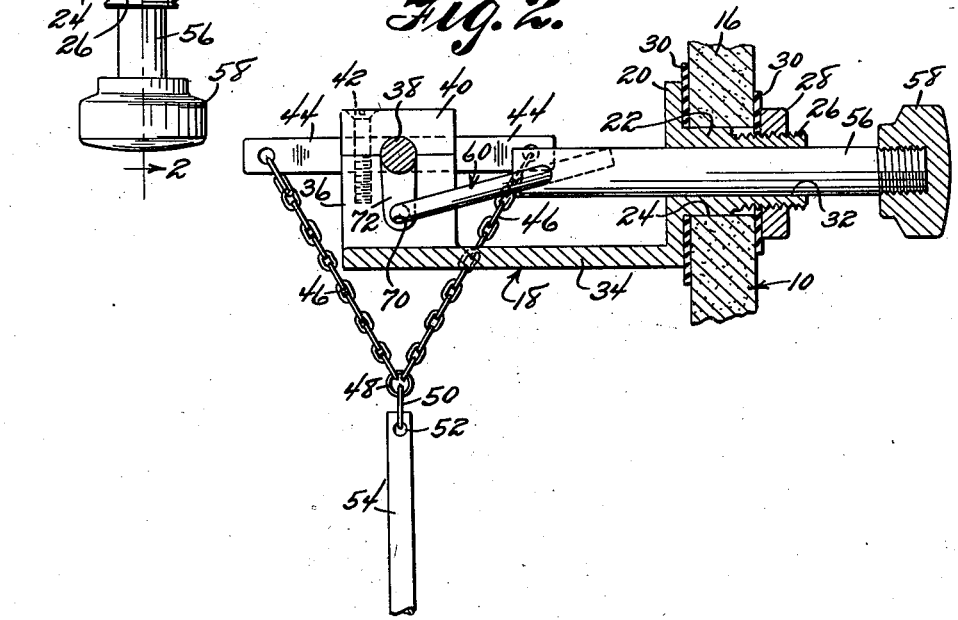

In the accompanying drawing:

Figure 1 is a horizontal sectional view of a portion of a conventional flush tank showing my invention incorporated therein, and Figure 2 is a sectional view taken along the line 2—2 of Figure 1.

In the embodiment of the invention selected for illustration, I make use of a conventional flush tank 10 equipped with the usual ball valve 12 which is lifted off its seat for flushing purposes. My valve actuator 14 is mounted on the front wall 16 of the tank 10.

The valve actuator 14 comprises a bracket 18 having a leg 20 provided with a square body 22 fitting snugly in a square opening 24 in the wall 16. This body terminates in a threaded shaft 26 for coaction with a nut 28 for clamping the bracket 18 to the wall 16. Sealing and cushioning washers 30 are placed between the wall 16 and the leg 20 and the nut 28. An opening 32 extends axially through the shaft 26 and the body 22.

The bracket 18 also includes a horizontal arm 34 having two upstanding posts 36. A rock shaft 38 is rotatably journaled in one post 36 and is rotatably mounted on the other post by a bearing cap 40 attached to that post by a screw 42. The shaft 38 lies horizontally and extends to a position directly over the valve 12.

A cross arm 44 is fixed to the shaft 38 and has a chain or other suitable pull means 46 attached to each end thereof. Both chains depend from the cross arm and are connected together at their lower ends by a small ring 48. The ring 48 is positioned vertically and centrally of the valve 12. A link 50 is connected with the ring 48 and is threaded through an eye 52 in the ball valve stem 54, the latter being operatively connected with the ball valve 12 in the usual manner. Thus the valve 12 may be lifted off its seat by exerting a pull on either chain 46, the lifting chain depending on the direction of rotation of the shaft 38.

Means for rocking the shaft 38 comprises a plunger 56 slidably guided in the opening 32. This plunger is provided with a knob 58 to facilitate manipulation of the plunger. A wire link 60 operatively connects the plunger 56 with the rock shaft 38 to impart rotation to the shaft through longitudinal movement of the plunger.

The link 60 is bent to provide a right-angular shaft part 62 extending loosely through a transverse bore 64 in the plunger 56. This shaft part terminates in a right-angular end 66 so that the shaft part is restrained from axial removal from the bore 64. The link 60 is further bent to provide a second right-angular shaft part 68 extending loosely through an opening 70 in an arm 72 fixed to the shaft 38. Thus axial movement of the plunger 56 swings the arm 72 and imparts rotation to the shaft 38, such rotation of the shaft rocking the cross arm 44 about a transverse axis for valve lifting purposes.

The end 66 and the knob 58 are so spaced from the leg 20 and the outer end of the shaft 26, respectively, as to confine the rotation of the shaft 38 within an arc of less than 90 degrees in either direction when viewing Figure 2, although the shaft 38 will engage the link 60 upon movement of the latter in one direction to prevent the shaft part 68 from moving beyond a dead center position. The arm 72 is arranged at right angles to the cross arm 44.

Without further elaboration, the foregoing will so fully explain my invention, that others may, by applying current knowledge, readily adapt the same for use under various conditions of service.

I claim:

1. In a flush tank having a valve, a bracket attached to the flush tank, a rock shaft rotatably mounted on said bracket and provided with an arm, a valve lifting means at one end of said shaft for lifting the valve upon rotation of the shaft in either direction, a plunger at right angles to said arm, and a link connecting the plunger and said arm.

2. In a flush tank having a valve, said flush tank being provided with an opening in one wall thereof, a bracket having a body lying in said opening and being provided with a bore, a horizontal rock shaft mounted on said bracket and extending to a position over said valve, a valve stem means provided with two flexible connections with said rock shaft to lift the valve stem means upon rotation of the rock shaft in either direction, a plunger slidable in said bore, and an operating connection between said plunger and said rock shaft.

3. In a flush tank having a valve, a bracket attached to the flush tank, a rock shaft mounted on said bracket and having a cross arm at one end located over said valve, a valve stem for said valve, two pull means having a common connection with said valve stem and respectively connected with the ends of said cross arm, and means slidably guided on said bracket for imparting rocking motion to said shaft.

4. In a flush tank having a valve, said flush tank being provided with an opening in one wall thereof, a bracket having first and second legs, a body on said first leg fitting in said opening and having a bore and a threaded part, nut means threadedly connected with said threaded part for clamping the bracket to the wall, said second leg having bearing means, a horizontal shaft rotatably supported in said bearing means, a cross arm fixed to said rock shaft and located above said valve, a valve stem operatively connected with said valve, flexible pull means having a common connection with said valve stem and respectively connected with the ends of said cross arm, said rock shaft being provided with an arm, a plunger slidably guided in said bore, and a link pivotally connected with said plunger and with said arm to impart rotation to said rock shaft through reciprocatory movement of the plunger.

5. The invention described in claim 4 wherein said plunger and said arm each includes a transverse bore, said link comprising a wire bent to provide a shaft part loosely receivable in the bore in the plunger and a second shaft part loosely receivable in the bore in said arm, said opening and said body being of corresponding and non-circular contour to restrain the bracket from rotation.

GEORGE D. MAIGE.